United States Patent
Hayashi et al.

(10) Patent No.: US 8,816,564 B2
(45) Date of Patent: Aug. 26, 2014

(54) BRUSHLESS ALTERNATOR

(75) Inventors: Hideyuki Hayashi, Chiyoda-ku (JP);
Yasuhiko Sugitani, Bunkyo-ku (JP);
Tomoki Takahashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 392 days.

(21) Appl. No.: 13/236,352

(22) Filed: Sep. 19, 2011

(65) Prior Publication Data

US 2012/0293039 A1    Nov. 22, 2012

(30) Foreign Application Priority Data

May 20, 2011 (JP) .................................. 2011-113608

(51) Int. Cl.
*H02K 1/22* (2006.01)
*H02K 19/24* (2006.01)
*H02K 3/46* (2006.01)

(52) U.S. Cl.
CPC . *H02K 19/24* (2013.01); *H02K 3/46* (2013.01)
USPC .......................................................... 310/263

(58) Field of Classification Search
None
See application file for complete search history.

(56) References Cited

U.S. PATENT DOCUMENTS

| | | | |
|---|---|---|---|
| 4,114,056 A * | 9/1978 | Nimura ............................ | 310/71 |
| 4,307,314 A * | 12/1981 | Yamada et al. ................ | 310/263 |
| 5,097,169 A * | 3/1992 | Fukushima .................... | 310/263 |
| 5,574,324 A * | 11/1996 | Hirama et al. ................. | 310/194 |
| 5,796,201 A * | 8/1998 | Kamitani et al. ............. | 310/194 |
| 6,384,506 B1 * | 5/2002 | Kojima et al. ................. | 310/194 |
| 6,967,423 B2 * | 11/2005 | Kuroda et al. ................ | 310/194 |
| 7,514,837 B2 * | 4/2009 | Kuroda et al. ................ | 310/263 |
| 7,884,524 B2 * | 2/2011 | Kuroda .......................... | 310/263 |
| 8,618,714 B2 * | 12/2013 | Hayashi ......................... | 310/263 |
| 2008/0122309 A1 * | 5/2008 | Kolomeitsev et al. ........ | 310/194 |
| 2011/0001376 A1 | 1/2011 | Kuroda | |

FOREIGN PATENT DOCUMENTS

| | | |
|---|---|---|
| JP | 57-154286 U | 9/1982 |
| JP | 2005-080440 A | 3/2005 |
| JP | 2007-037233 A | 2/2007 |
| JP | 2011-015563 A | 1/2011 |

OTHER PUBLICATIONS

Japanese Office Action issued May 7, 2013, in Patent Application No. 2011-113608.

* cited by examiner

*Primary Examiner* — Tran Nguyen
(74) *Attorney, Agent, or Firm* — Sughrue Mion, PLLC

(57) ABSTRACT

A brushless alternator of the present invention includes: a yoke whose inner circumferential surface is radially opposite via an air gap to a rotor revolvably supported by brackets; a stator supported by the brackets, for forming a magnetic circuit along with the rotor and the yoke; a bobbin for engaging with the outer circumferential surface of a thin portion of the yoke; a field coil wound around the bobbin, for producing magnetic flux; and a plate joined to the thin portion, for axially holding the bobbin; wherein the thin portion of the yoke and the other portion thereof are integrally formed in one piece using a single member.

3 Claims, 2 Drawing Sheets

BRUSHLESS ALTERNATOR

BACKGROUND OF THE INVENTION

1. Field of the Invention

The present invention relates to brushless alternators.

2. Description of the Related Art

The rotor of an alternator used for a vehicular AC generator is revolved by a vehicle engine by way of a shaft, a pulley and a belt. The alternator has been increasing in size and weight as an electrical load of the vehicle becoming heavier; therefore, the increase in weight of the rotor itself now imposes a heavy burden on the engine. In particular, the increase in the rotor weight and inertia results in shortage of engine drive torque, causing a serious problem in the light of reducing idle revolution speed and enhancing acceleration capability. In order to decrease the weight and inertia of this rotor and furthermore to cope with increasing demand for enhanced longevity in recent years, a brushless alternator has been conventionally known, in which the field coil of the rotor is fixed to a bracket, and a claw-shaped magnet pole portion for conducting magnet flux revolves (refer to Patent Document 1, for example).

The brushless alternator shown in Patent Document 1 includes a bobbin on which the field coil is fixed, and a step portion provided on a second ring-shaped yoke constituting the bobbin is fixed to one end of a cylindrical portion of a plate for restricting axial movement of the bobbin. There is proposed a structure in which the radial thickness of the cylindrical portion of the plate fixed as above is optimized, whereby its magnetic circuit can be improved and output from the brushless alternator can be enhanced.

Patent Document 1: Japanese Laid-Open Patent Publication No. 2007-37233

In the brushless alternator described in Patent Document 1, two factors, that is, an advantage of enhancing an output current and output efficiency of the brushless alternator by reducing magnetic resistance by varying the radial thickness of the cylindrical portion of the plate and a disadvantage of the output current and output efficiency of the alternator reducing attributed to a decrease in a field current through the field coil, have been taken into consideration in a comprehensive manner, and as a result, the radial thickness of the cylindrical portion of the plate has been quantitatively determined. However, since the structure has a joint in the magnetic circuit, at which the step portion of the second yoke is joined to the plate by spot-welding, the magnetic resistance remains high at the joint due to stress concentration attributed to the spot-welding; therefore, magnetic flux produced by the field current in some cases is not effectively utilized, which has resultantly caused a decrease in the output current and output efficiency of the brushless alternator.

In the brushless alternator described in Patent Document 1 here, methods other than spot-welding, such as gluing and screwing, are also described as a method of fixing the foregoing step portion of the second yoke and the plate with each other; however in a structure of using those methods, for example, the weight of the plate itself as well as that of the bobbin including the field coil must be supported at the joint at which the step portion of the second yoke and the plate are joined together; therefore, there have been disadvantages such as applications of the brushless alternator are restricted to those used in an environment requiring not so strict heat and vibration resistance.

SUMMARY OF THE INVENTION

The present invention has been made to resolve the problems described above, and aims at providing a brushless alternator capable of achieving higher output power and greater efficiency by reducing the magnetic resistance of the magnetic circuit.

A brushless alternator according to the present invention comprises: a shaft; a rotor having a magnetic pole, for revolving along with the shaft; a stator disposed outside the rotor opposite thereto; a bracket for revolvably supporting the shaft and housing therein the rotor and the stator; a yoke fixed to the bracket, whose inner circumferential surface is opposite to the rotor via an air gap, for forming a magnetic circuit along with the rotor and the stator; a bobbin for engaging with the outer circumferential surface of a thin portion of the yoke whose outer diameter is smaller than that of the other portion thereof; a field coil wound around the bobbin, for producing magnetic flux; and a holding member joined to the thin portion, for axially holding the bobbin; wherein the thin portion of the yoke and the other portion thereof are integrally formed in one piece using a single member.

According to a brushless alternator of the present invention, the joint between the yoke constituting part of the magnetic circuit for the magnetic flux produced by the field coil and the holding member for axially fixing the bobbin around which the field coil is wound is located at a point distant from the magnetic circuit, so that the magnetic resistance of the circuit can be reduced. Therefore, a brushless alternator enhancing the output power and efficiency thereof can be provided.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
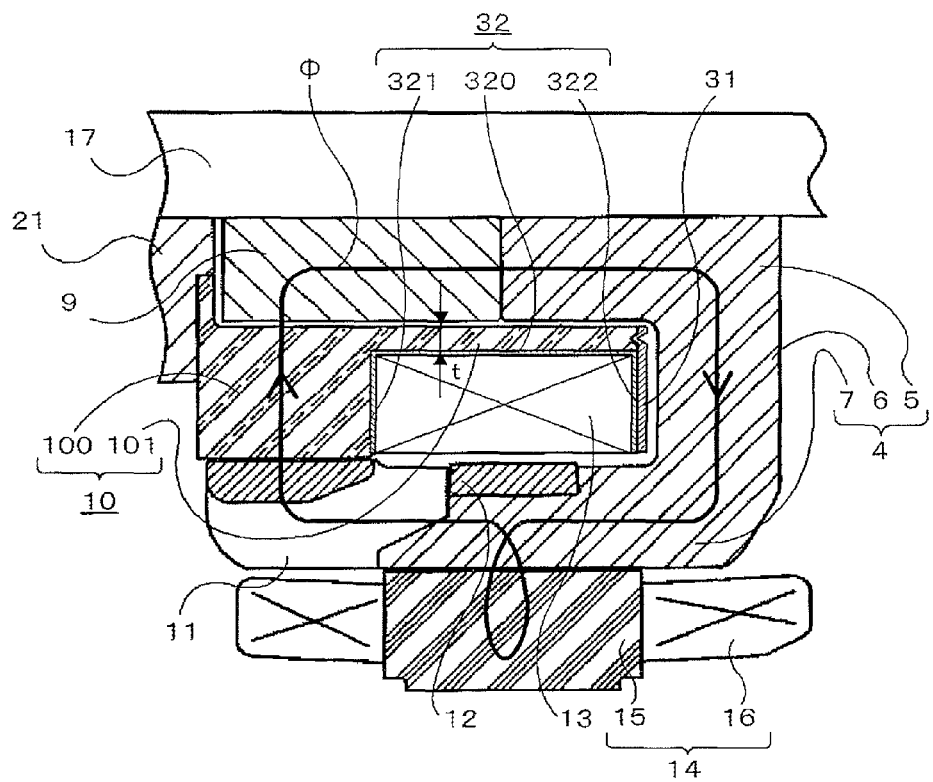
FIG. 1 is an enlarged axial cross-sectional view of the essential portion of a brushless alternator according to Embodiment 1 of the present invention.
Figure 2:
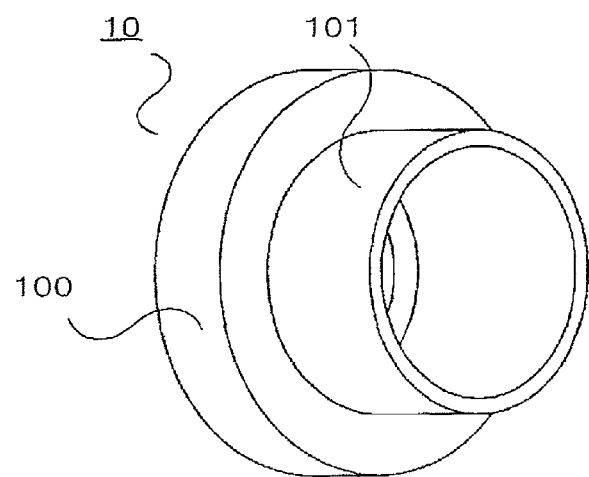
FIG. 2 is a perspective view of a second yoke of the brushless alternator shown in FIG. 1.

FIG. 1 is an enlarged axial cross-sectional view of the essential portion of a brushless alternator according to Embodiment 1 of the present invention; FIG. 2, a perspective view of a second yoke of the brushless alternator shown in FIG. 1; and FIG. 3, an axial cross-sectional view of the brushless alternator shown in FIG. 1.

Firstly, the structure of the brushless alternator according to Embodiment 1 of the present invention will be explained.

Figure 3:
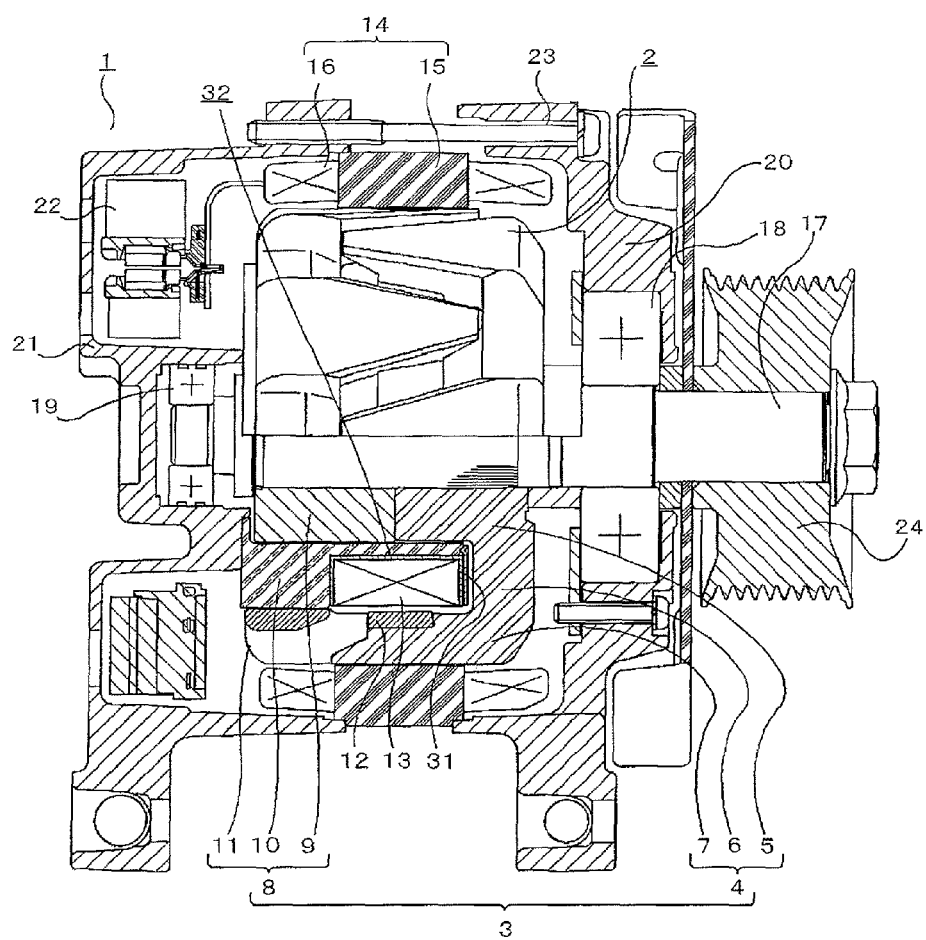
FIG. 3 is an axial cross-sectional view of the brushless alternator shown in FIG. 1.

In FIG. 3, the brushless alternator 1 comprises: a front bracket 20 and a rear bracket 21 integrated with each other by a through bolt 23; a stator 14 fixed to the front bracket 20 and the rear bracket 21, including a stator core 15 and a stator winding 16 wound around the stator core 15; a shaft 17 both ends of which are revolvably supported by a front bearing 18 and a rear bearing 19 fitted to the front bracket 20 and the rear bracket 21, respectively; a rotor 2 fixed to the shaft disposed inside the stator 14; a rectifier 22 electrically connected to the stator winding 16, for converting AC into DC output; and a regulator (not shown in the figure) electrically connected to the rotor 2, for regulating within a predetermined range an AC voltage generated by the stator winding 16.

The shaft 17 extends outwardly of the front bracket 20 side; a pulley 24 is fixed to this extending portion. This pulley 24 and the engine (not shown in the figure) are bound together with a belt so that the shaft 17 is set to revolve driven by the engine by way of the belt.

And, the front bracket 20 revolvably supports one end of the shaft 17 by way of the front bearing 18; the rear bracket 21 revolvably supports the other end thereof by way of the rear bearing 19. The rotor 2 is thereby revolvably disposed inside the front bracket 20 and the rear bracket 21.

The rotor 2 includes a magnetic pole core 3 and a field coil 13 disposed inside this magnetic pole core 3.

The magnetic pole core 3 includes a front magnetic pole core 4 disposed in the front bracket 20 side and a rear magnetic pole core 8 disposed in the rear bracket 21 side.

The front magnetic pole core 4 includes a first cylindrical boss portion 5 fixed to the shaft 17 with the shaft inserted therethrough at the center; a first thick ring-shaped yoke 6 extending radially and outwardly from one end of the first boss portion 5; and a first claw-shaped magnetic pole portion 7 whose tip portion extends toward the rear bracket 21 side, along the shaft axis, from the outer circumferential surface of the first yoke 6.

The rear magnetic pole core 8 includes a second cylindrical boss portion 9 fixed to the shaft 17 with the shaft inserted therethrough at the center; a second yoke 10 disposed radially outside the second cylindrical boss portion 9 via a narrow air gap; and a second claw-shaped magnetic pole portion 11 disposed radially outside the second yoke 10 via another narrow gap and whose tip portion extends toward the front bracket 20 side along the shaft axis.

Opposing axial end faces of the second boss portion 9 and the first boss portion 5 are in surface contact with each other. The second claw-shaped magnetic pole portion 11 and the first claw-shaped magnetic pole portion 7 are disposed so that their tip portions engage with each other. Inner circumferential surfaces of the first claw-shaped magnetic pole portion 7 and the second claw-shaped magnetic pole portion 11 each are joined to the outer circumferential surface of an annular ring 12 made of non-magnetic material, all over the circumferential surface thereof, by welding or hard soldering; therefore the first claw-shaped magnetic pole portion 7 and the second claw-shaped magnetic pole portion 11 are joined together by way of the ring 12.

The field coil 13 is disposed in a space created by the first claw-shaped magnetic pole portion 7 and the second claw-shaped magnetic pole portion 11 opposite to this first claw-shaped magnetic pole portion 7.

The field coil 13 is wound from a wire around the bobbin 32 made of nylon resin, sharing a common axis with the shaft 17. The lead wires (not shown in the figure) at both ends of the wire wound a plurality of turns around the bobbin 32 are connected to the regulator. The bobbin includes a cylindrical portion 320 and a pair of flanges, a first flange 321 and a second flange 322, that extend radially and outwardly from the respective ends of the cylindrical portion 320.

As shown in FIG. 1, the second yoke 10 includes a cylindrical thin portion 101 and a cylindrical thick portion 100 that extends axially from one end of the thin portion 101 and whose outer diameter is larger than that of the thin portion 101, and those are integrally formed in one piece using a single member. Moreover, the inner diameter of the thick portion 100 is equal to that of the thin portion 101, forming the same inner circumference surface.

The inner circumferential surface of the thick portion 100 is opposed to the outer circumferential surface of the second boss portion 9 via the narrow air gap, and that of the thin portion 101 to the outer circumferential surface of the first boss portion 5 also via a narrow air gap.

The inner circumferential surface of the cylindrical portion 320 of the bobbin 32, which constitutes the field coil 13, engages with the outer circumferential surface of this thin portion 101; the first flange 321 of the bobbin 32 abuts an axial end face of the thick portion 100. A discoid plate 31 made by pressing soft steel sheet, which serves as a holding member for restricting axial movement of the bobbin 32, is joined to an axial end face of the thin portion 101 of the second yoke 10, and also abuts an axial end face of the second flange 322 of the bobbin 32. The bobbin 32 is thereby held on the second yoke 10. In addition, the second yoke 10 is fixed to the rear bracket 21.

As to each of dimensional relations among the second yoke 10, the bobbin 32 and the plate 31, the inner diameter of the cylindrical portion 320 of the bobbin 32 is substantially the same as the outer diameter of the thin portion 101 of the second yoke 10; the axial length of the bobbin 32 is substantially the same as that of the thin portion 101 of the second yoke 10. Furthermore, the radial length of each of the first flange 321 and the second flange 322 of the bobbin 32 is substantially the same as the radial length of the plate 31 and that of the thick portion 100 of the second yoke 10.

The stator 14 is disposed surrounding the outer circumferential surface of the rotor 2. Moreover, the stator 14 is sandwiched between the front bracket 20 and the rear bracket 21 with both axial ends of the stator core 15 held by the through bolt 23.

Next, a process of assembling the field coil 13 and the plate 31 onto the second yoke 10 will be explained.

Firstly, the bobbin 32 is inserted onto the thin portion 101 of the second yoke 10; the first flange 321 of the bobbin 32 is abutted with an axial end face of the thick portion 100 of the second yoke 10. Next, the plate 31 is joined to the axial end face of the thin portion 101 of the yoke 10 by spot-welding regularly and sequentially at a plurality of points on the circumference. Following that, a wire is wound around the bobbin 32 to make up the coil 13. Lastly, the second yoke 10 is screwed in this state onto the rear bracket 21 using fixing screws (not shown in the figure).

In the brushless alternator 1 structured as described above, the field coil 13 is supplied with a current from a battery (not shown in the figure) so as to produce magnetic flux.

As shown in FIG. 1, this magnetic flux $\Phi$ flows through a path in such a way that the flux transmits from the second yoke 10 to the second boss portion 9 via the narrow air gap provided radially in the inner side of the yoke, then passes through the first boss portion 5 that abuts the second boss portion 9 on the inner end face thereof, the first yoke 6 and the first claw-shaped magnetic pole portion 7, crosses the stator 14 disposed in the radial outer side of the rotor 2, following that, the flux $\Phi$ passes through the second claw-shaped magnetic pole portion 11 and a narrow air gap provided in the radial inner side thereof, and finally returns to the second yoke 10. Therefore, the first claw-shaped magnetic pole portion 7 and the second claw-shaped magnetic pole portion 11 are magnetized in the N and S poles, respectively.

Meanwhile, the pulley 24 is driven by the engine so that the shaft 17 to which the pulley is directly joined revolves, thereby revolving the rotor 2. Thereby, the magnetic field produced by the field coil 13 also revolves. The magnetic flux $\Phi$ constituting this revolving magnetic field is transmitted to the stator core 15 through the foregoing path, which generates electromotive force in the stator winding 16. This generated AC power is rectified into DC power by the rectifier 22 and stored at the battery.

At this moment, since the field coil 13 is mounted on the second yoke 10 screwed onto the rear bracket 21, the coil does not revolve, but the front magnetic pole core 4 that is integrally formed of the first boss portion 5, the first yoke 6 and the first claw-shaped magnetic pole portion 7, the second boss portion 9 of the rear magnetic pole core 8 and the second claw-shaped magnetic pole portion 11 thereof revolve.

In the brushless alternator 1 according to this Embodiment 1 described above, the thin portion 101 and the thick portion 100 of the second yoke 10 are integrally formed in one piece using a single member, and this thin portion 101 and the plate 31 are joined to each other at a point close to an axial end face of the second flange 322 of the bobbin 32; therefore there is no joint between the second yoke 10 and the plate 31 in the magnetic path through which the magnetic flux Φ transmits from the second yoke 10 to the second boss portion 9 via the narrow air gap provided in the radial inner side thereof, whereby the magnetic resistance of the path can be reduced, so that the magnetic property can be enhanced. As a result, an output current from the brushless alternator of this invention can be increased compare to that from a conventional one in which the joint between the second yoke and the plate exists on the magnetic path; therefore a brushless alternator capable of achieving higher output and greater efficiency can be provided.

Moreover, in a structure as described in this Embodiment 1, the radial thickness t of the thin portion 101 of the second yoke 10 shown in FIG. 1 can be set in a more flexible manner. Increasing the radial thickness t of the thin portion 101 enables a larger contact area to be secured in joining the plate 31 to the thin portion 101, enhancing joining workability, so that productivity of the brushless alternator can be enhanced. However on the other hand, the inner diameter of the field coil 31 and the coil length become larger, and as a result, the field current flowing through the field coil is decreased and output efficiency is lowered, furthermore leading to an increase in the size of the brushless alternator 1. To that end, the radial thickness t of the cylindrical portion 101 of the second yoke 10 can be set to an optimum value, taking into consideration in a comprehensive manner the productivity, output power and efficiency of the brushless alternator 1.

Furthermore, the inner diameters of the thick portion 100 and the thin portion 101 of the second yoke 10 are the same, so that the same inner circumferential surface is formed, and the plate 31 is joined to the second yoke 10 on the axial end surface of the thin portion 101 of the yoke; therefore, the width of the narrow air gap provided radially in the inner side of thick portion 100 of the second yoke 10 can be set the same as that provided radially in the inner side of thin portion 101 of the second yoke 10. In the conventional brushless alternator, when the plate is welded to the second yoke, weld marks stick out radially toward the inner side thereof; therefore a structure securing a wider air gap needs to be employed, which has been a factor of increasing the magnetic resistance.

In this Embodiment 1, the narrow air gap provided from the thin portion 101 radially in the inner side thereof is not unnecessarily increased, so that the increase in the magnetic resistance at this air gap can be suppressed. Therefore, the output current can be enhanced compared to the conventional brushless alternator, and as a result, a brushless alternator capable of achieving higher output and greater efficiency can be provided.

Moreover, the brushless alternator of this Embodiment 1 is structured in such a way that the axial length of the bobbin 32 and that of the thin portion 101 of the yoke 10 are set substantially the same so that a maximum area of the inner circumferential surface of the cylindrical portion 320 of the bobbin 32 engaging with the outer circumferential surface of the thin portion 101 of the second yoke 10 can be secured. Therefore, heat generated in the field coil 13 is dissipated from the thin portion 101 of the second yoke 10 to the rear bracket 21 by way of the thick portion 100 of the second yoke 10. In this Embodiment 1, the heat generated in the field coil 13 is directly transmitted to the second yoke 10, there is no joint such as a welding point in the heat dissipation path, and the second yoke is made of a single member; therefore, heat conductivity and heat dissipation can be enhanced compared to the conventional brushless alternator, thereby suppressing heat generation in the field coil 13, and as a result, a decrease in the field current is suppressed, which can further enhance output power and efficiency of the brushless alternator. In addition, since the heat generation in the field coil 13 is suppressed, a brushless alternator that excels in heat resistance and longevity can be provided.

Furthermore, since the outer diameter of the plate 31 is substantially the same as that of the second flange 322 of the bobbin 32 in this Embodiment 1, the plate 31 abuts the second flange 322 of the bobbin 32 all over the surface thereof, whereby bearing can be reduced, so that a brushless alternator that excels in durability can be provided.

In this Embodiment 1, since the plate 31 is joined to the axial end face of the thin portion 101 of the second yoke 10 by spot-welding, that is, resistance-welding, which excels in heat resistance and enables reduction in production manpower compared to that using soft soldering, for example, a brushless alternator can be provided in which greater longevity and cost down through enhanced productivity can be achieved.

Moreover, since the axial length of the bobbin 32 and that of the thin portion 101 of the second yoke 10 are substantially the same, even if the plate 31 is spot-welded to the axial end face of the thin portion 101, the spot-welded points are distant from the magnetic circuit; therefore their adverse affect on the magnetic property will be small.

Furthermore, the brushless alternator in this Embodiment 1 is structured in such a way that the axial length of the bobbin 32 and that of the thin portion 101 of the second yoke 10 are set substantially the same as described; therefore, the plate 31 can be welded from the axial direction, so that the plate 31 can be easily assembled. Furthermore, since the plate 31 can be welded to the axial end face of the thin portion 101, a space for welding work can be secured enough, thereby enhancing productivity. Furthermore, dimensions of portions of the second yoke 10, the field coil 13 and the plate 31 need to be controlled in order to firmly fix the bobbin 32 without play in the axial direction when assembled to the second yoke 10; however in a structure as in this Embodiment 1, the number of such dimensions can be reduced to two including the axial length of the thin portion 101 of the second yoke 10 and that of the bobbin 32. In the conventional structure, dimensions of three portions, that is, the axial length of each of the step portion of the second yoke, the cylindrical portion of the plate and the bobbin, need to be controlled. By structuring as this Embodiment 1, a brushless alternator capable of achieving further enhanced productivity and cost down can be provided.

Moreover, since the thin portion 101 and the plate 31 are joined to each other by spot-welding that excels in heat resistance and can secure strength, a brushless alternator according to this Embodiment 1 can be used as a vehicular AC generator subject to a severe environment of use such as severe temperature and vibration.

In this Embodiment 1, a case in which the thin portion 101 is joined to the plate 31 by spot-welding has been explained; however the welding method is not limited to this, but other welding such as projection-welding can be used, or the plate 31 may be press-fitted onto protrusions provided on the axial end face of the thin portion 101. Moreover, by structuring as described above, the plate 31 can be made smaller compared to a conventional annular cylindrical plate having a flange extending radially; therefore strength of the joint between the thin portion 101 and the plate 31 that sustains the plate's own weight can be reduced. Therefore, if the joint is strong enough even by hard or soft soldering, those soldering methods can also be used.

Moreover, welding locations of the plate 31 have been explained to be on the axial end face of the thin portion 101 of the second yoke 10; however the locations are not limited to this. For example, when the plate 31 is cylindrical having a flange extending radially, the outer circumferential surface of the cylindrical portion may be joined to the inner circumferential surface of the thin portion 101 by welding with the flange abutting the axial end face of the thin portion 101.

In this Embodiment 1, the surface of the second flange 322 of the bobbin 32 abuts the plate 31 all over the surface; however the way of abutment is not limited to this. For example, even if the outer diameter of the plate 31 is smaller than that of the second flange 322 of the bobbin 32, its axial movement can be restricted as far as the plate 31 abuts at least part of the second flange 322 of the bobbin 32.

In addition, the bobbin 20 is made of nylon resin in this Embodiment 1; however it may be made of thermosetting resin such as phenol resin. Furthermore, the bobbin may be made by applying isolating resin, that is, isolating material, between the field coil 13 and both the thick portion 100 and thin portion 101 of the second yoke 10 and between the field coil 13 and the plate 31, that is, on the surfaces of the field coil except for those opposed to the first claw-shaped magnetic pole portion 7 and the second claw-shaped magnetic pole portion 11, or it may be made using isolating paper.

Moreover, the second yoke 10 engaging with the field coil 13 is disposed as screwed to the rear bracket 21 side in this Embodiment 1; however it can be disposed in the front bracket 20 side. In order to do that, locations of the magnetic pole core 4 and the magnetic pole core 8 may be exchanged between them.

Furthermore, the second yoke 10 is fixed to the rear bracket 21 using a fixing bolt; however it can be fixed using glue or by riveting or the like. Fixing by riveting would suppress the second core coming off better than fixing with the fixing bolt or glue.

Various modifications and alterations of this invention will be apparent to those skilled in the art without departing from the scope and spirit of this invention, and it should be understood that this is not limited to the illustrative embodiments set forth herein.

What is claimed is:

1. A brushless alternator, comprising:
   a shaft;
   a rotor having a magnetic pole, for revolving along with the shaft;
   a stator disposed outside the rotor opposite thereto;
   a bracket for revolvably supporting the shaft and housing therein the rotor and the stator;
   a yoke fixed to the bracket, said yoke having an inner circumferential surface opposite to the rotor via an air gap, for forming a magnetic circuit along with the rotor and the stator;
   a bobbin for engaging with the outer circumferential surface of a thin portion of the yoke whose outer diameter is smaller than that of the other portion of the yoke;
   a field coil wound around the bobbin, for producing magnetic flux; and
   a holding member joined to an axial end face of the thin portion by resistance-welding while an axial end face of the bobbin abutting the holding member all over the face, to thereby axially hold the bobbin,
   wherein the axial length of the bobbin and that of the thin portion are substantially the same,
   wherein the width of the air gap at the thin portion of the yoke is the same as that at the other portion thereof, and
   wherein the thin portion of the yoke and the other portion thereof are integrally formed in one piece using a single member.

2. The brushless alternator according to claim 1, wherein the brushless alternator is a vehicle-use brushless alternator.

3. The brushless alternator according to claim 1, wherein the bracket and the yoke are fixed to each other by riveting.

* * * * *